United States Patent
Bianco et al.

(10) Patent No.: US 10,412,930 B2
(45) Date of Patent: Sep. 17, 2019

(54) INTERACTIVE WATER CONTAINER APPARATUS FOR ANIMALS

(71) Applicant: Mindfull Products, San Juan Capistrano, CA (US)

(72) Inventors: Ronald Bianco, Laguna Beach, CA (US); Veronica Armida-Raylene Rodriquez, Newark, CA (US); Jose Barrios, Chino, CA (US)

(73) Assignee: Mindfull Products, San Juan Capistrano, CA (US)

( * ) Notice: Subject to any disclaimer, the term of this patent is extended or adjusted under 35 U.S.C. 154(b) by 322 days.

(21) Appl. No.: 15/469,338

(22) Filed: Mar. 24, 2017

(65) Prior Publication Data
US 2018/0271055 A1   Sep. 27, 2018

(51) Int. Cl.
*A01K 7/00* (2006.01)
(52) U.S. Cl.
CPC ..................... *A01K 7/00* (2013.01)
(58) Field of Classification Search
CPC .......... A01K 7/00; A01K 7/005; A01K 39/02; A01K 39/0206; A01K 15/025; A01K 63/00
See application file for complete search history.

(56) References Cited

U.S. PATENT DOCUMENTS

| | | | | |
|---|---|---|---|---|
| 2,299,551 | A * | 10/1942 | McGahey | A63H 23/16 114/346 |
| 2,509,785 | A * | 5/1950 | Rubin | A63F 9/34 273/140 |
| 4,958,593 | A * | 9/1990 | Hurlburt | A01K 63/003 119/246 |
| 4,961,276 | A | 10/1990 | Lin | |
| 5,632,228 | A * | 5/1997 | Ybarra | A01K 5/0114 119/51.5 |
| 5,794,565 | A * | 8/1998 | Beshah | A01K 5/0135 119/61.54 |

(Continued)

OTHER PUBLICATIONS

International Search Report and Written Opinion, PCT/US2018/020478, dated May 23, 2018.

*Primary Examiner* — Magdalena Topolski
(74) *Attorney, Agent, or Firm* — Entralta P.C.; Justin G. Sanders; Peter D. Weinstein

(57) ABSTRACT

An interactive water container apparatus is disclosed and configured for encouraging an animal to drink therefrom. In at least one embodiment, an outer container is sized and configured for holding a volume of fluid, the outer container providing an at least one opening sized and configured for allowing the animal to access and drink the fluid therewithin. At least one inner container is positioned substantially within the outer container. At least one interactive object is positioned within the outer container such that the at least one inner container is positioned between the interactive object and the opening of the outer container, thereby allowing the animal to see said interactive object while being unable to physically contact said interactive object. A pump is configured for circulating the fluid within at least one of the outer container and the at least one inner container. Through circulating the fluid, the pump further causes the at least one interactive object to move through the fluid, which entices the animal into interacting with, and ultimately into drinking, the fluid.

20 Claims, 5 Drawing Sheets

(56) References Cited

U.S. PATENT DOCUMENTS

| | | | |
|---|---|---|---|
| 6,044,797 A | 4/2000 | Leason et al. | |
| 6,990,762 B1* | 1/2006 | Muday | A01K 15/025 |
| | | | 119/707 |
| 7,059,270 B1* | 6/2006 | Loginov | A01K 61/85 |
| | | | 119/51.04 |
| 8,245,665 B2 | 8/2012 | Willett | |
| 8,720,377 B1* | 5/2014 | McLean | A01K 63/006 |
| | | | 119/225 |
| 8,733,295 B2 | 5/2014 | Lipscomb et al. | |
| 9,049,847 B1* | 6/2015 | Trisel | A01K 63/006 |
| 9,089,113 B2* | 7/2015 | Jacobs | A01K 63/02 |
| 9,591,832 B2* | 3/2017 | Price | A01K 15/025 |
| 10,085,418 B2* | 10/2018 | Bales | A01K 5/00 |
| 2006/0160459 A1 | 7/2006 | Chien-Chih | |
| 2008/0072835 A1* | 3/2008 | Hongtawornsiri | A01G 9/02 |
| | | | 119/246 |
| 2015/0189856 A1* | 7/2015 | Alexander | A01K 7/02 |
| | | | 119/74 |
| 2017/0127648 A1* | 5/2017 | O'Donnell | A01K 15/025 |
| 2017/0188543 A1* | 7/2017 | Tota | A01K 5/0142 |

* cited by examiner

INTERACTIVE WATER CONTAINER APPARATUS FOR ANIMALS

RELATED APPLICATIONS

Not applicable.

BACKGROUND

The subject of this patent application relates generally to water containers, and more particularly to an interactive water container apparatus for animals configured for encouraging said animals to drink therefrom.

Applicant(s) hereby incorporate herein by reference any and all patents and published patent applications cited or referred to in this application.

By way of background, some animals—such as cats, for example—are naturally curious and possess a natural desire to play or hunt. Cats have predatory instincts and a vision system that is keyed to motion, which causes them to be interested in anything moving. However, cats can be both interested in and yet apprehensive of water. Furthermore, given that many cats don't have a high thirst drive, cats often don't drink because they don't think about it. As a result, cats may not drink enough water and, in turn, develop health issues—especially in domestic environments where cats are expected to drink from stationary water containers, such as bowls or the like. Accordingly, there is a need for an apparatus configured for encouraging cats—along with other animals—to drink water from water containers.

Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing an interactive water container apparatus for animals configured for encouraging said animals to drink therefrom. In at least one embodiment, the apparatus provides an outer container sized and configured for holding a volume of fluid, the outer container providing an at least one opening sized and configured for allowing the animals to access and drink the fluid therewithin. An at least one inner container is positioned substantially within the outer container. An at least one interactive object is positioned within the outer container such that the at least one inner container is positioned between the interactive object and the opening of the outer container, thereby allowing the animals to see said interactive object while being unable to physically contact said interactive object. An at least one pump is in fluid communication with at least one of the outer container and the at least one inner container, the at least one pump configured for circulating the fluid within at least one of the outer container and the at least one inner container. Thus, through circulating the fluid, the pump further causes the at least one interactive object to move through the fluid, which entices the animals into interacting with, and ultimately into drinking, the fluid Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
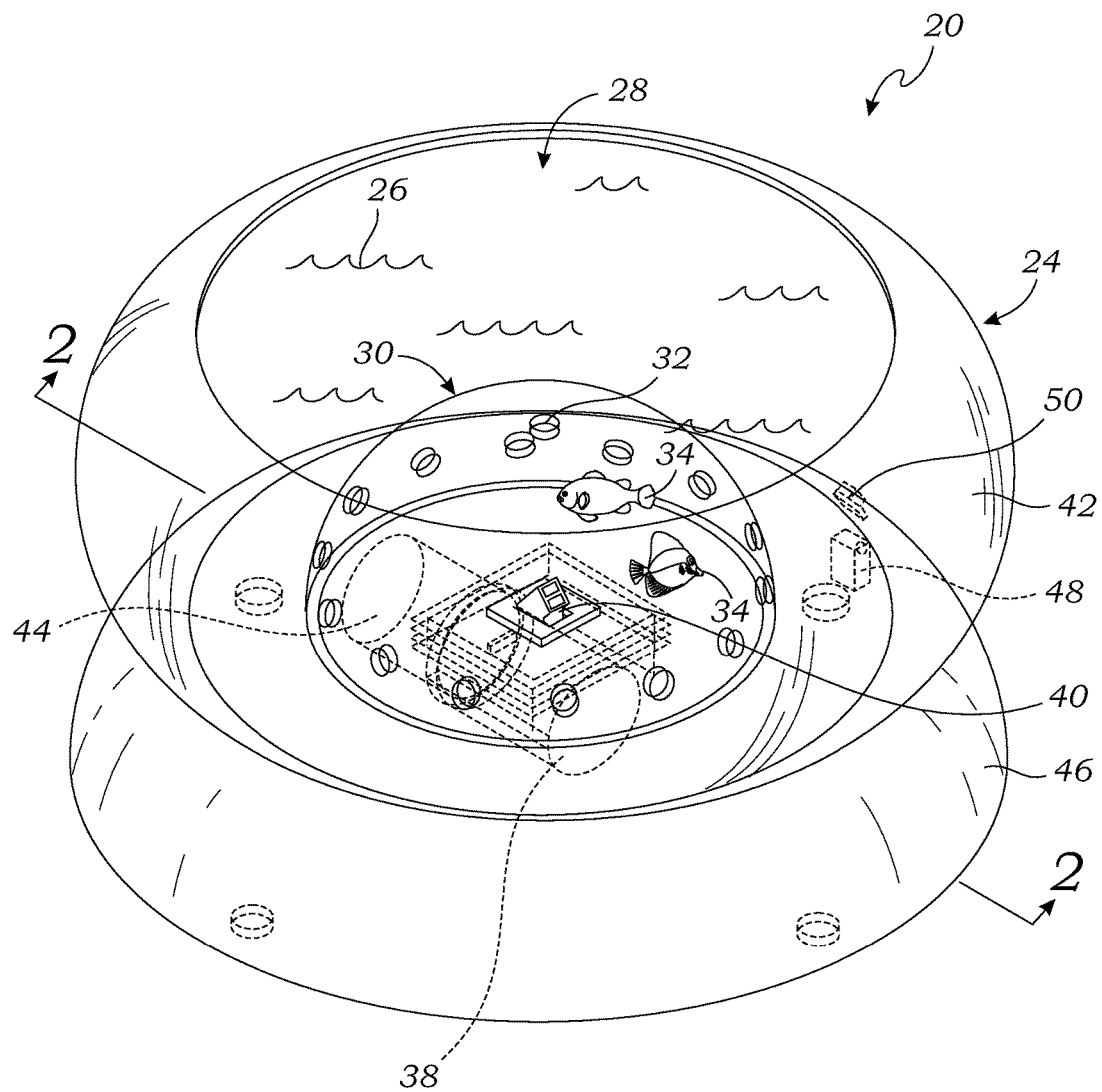
FIG. 1 is a perspective view of an exemplary interactive water container apparatus, in accordance with at least one embodiment.
Figure 5:
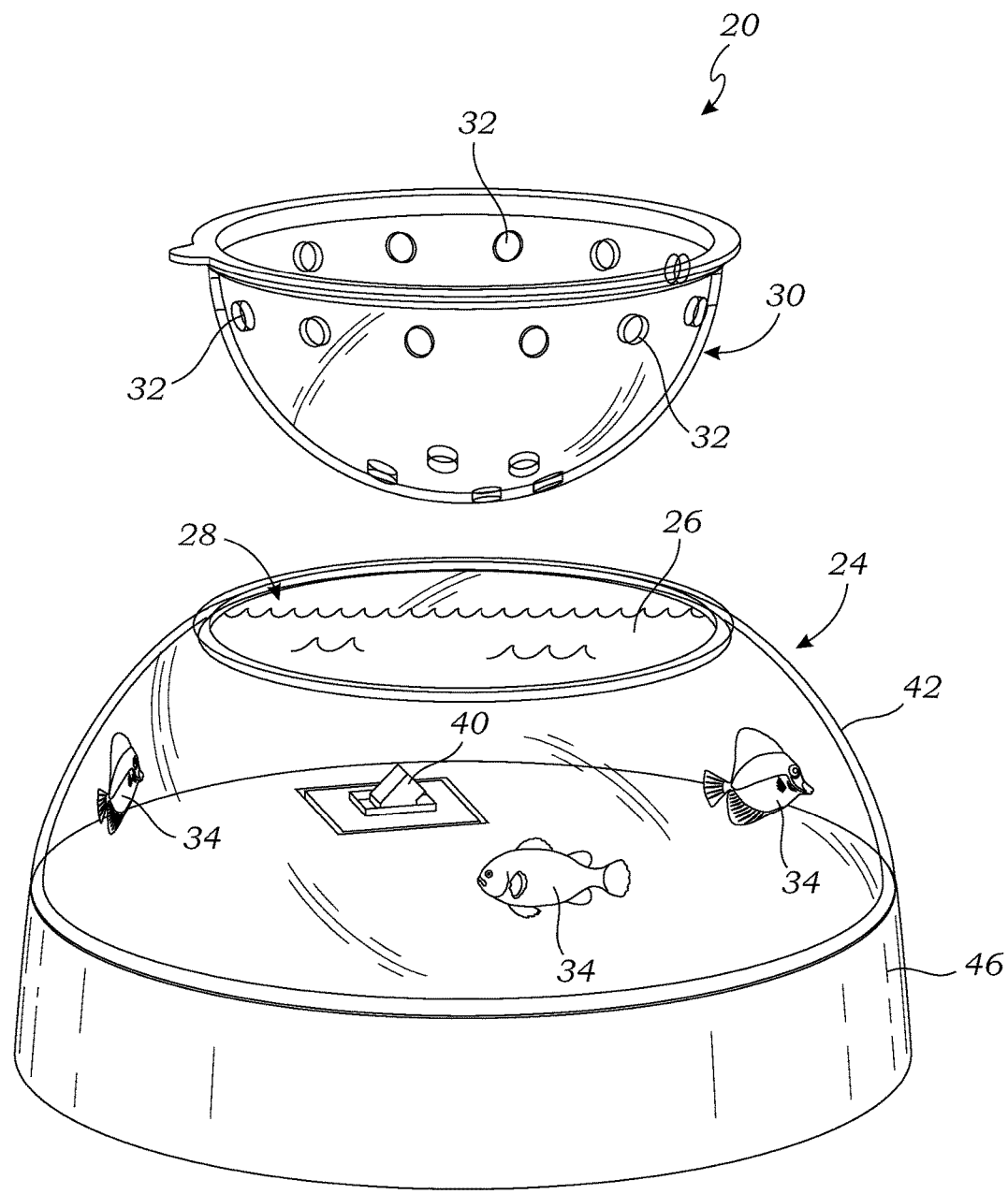
FIG. 5 is an exploded view of said further exemplary interactive water container apparatus, in accordance with at least one embodiment.

Turning now to FIG. 1, there is shown a perspective view of an exemplary embodiment of an interactive water container apparatus 20 for an at least one animal 22 configured for encouraging said animal 22 to drink therefrom. In at least one embodiment, the apparatus 20 provides an outer container 24 sized and configured for holding a volume of fluid 26—such as water, for example—with the outer container 24 providing an at least one opening 28 sized and configured for allowing the animal 22 to access and drink the fluid 26 therewithin. An at least one inner container 30 is positioned substantially within, and in fluid communication with, the outer container 24. In at least one alternate embodiment, the at least one inner container 30 is not in fluid communication with the outer container 24, but instead holds a separate volume of fluid 26 therewithin. In at least one embodiment, the at least one inner container 30 is removably positioned within the outer container 24 (FIG. 5); however, in at least one alternate embodiment, the at least one inner container 30 is permanently positioned within the outer container 24. In at least one embodiment, the at least one inner container 30 provides an at least one container aperture 32 positioned and configured for allowing the fluid 26 to freely flow between said inner container 30 and the outer container 24. In at least one embodiment, the outer container 24 is constructed out of a transparent or semi-transparent material—such as plastic or glass, for example—allowing the animal 22 to see through the outer container 24. However, in further embodiments, the outer container 24 may be constructed out of an opaque material. Similarly, in at least one embodiment, the at least one inner container 30 is constructed out of a transparent or semi-transparent material—such as plastic, glass or mesh, for example—allowing the animal 22 to see through said inner container 30, the purpose of which is discussed further below. At the outset, it should be noted that the particular size, shape and dimensions of the outer container 24 depicted in the drawings is merely exemplary and shown for illustrative purposes. Accordingly, in further embodiments, the outer container 24 may take on any other size, shape or dimensions now known or later developed, so long as the apparatus 20 is capable of substantially carrying out the functionality described herein. Similarly, the particular size, shape, dimensions and quantity of inner containers 30—along with the relative positions of said inner containers 30 within the outer container 24—depicted in the drawings is merely exemplary and shown for illustrative purposes. Accordingly, in further embodiments, the at least one inner container 30 may take on any other size, shape, dimensions or quantities now known or later developed, and may be positioned anywhere else within the outer container 24, so long as the apparatus 20 is capable of substantially carrying out the functionality described herein.

Figure 3:
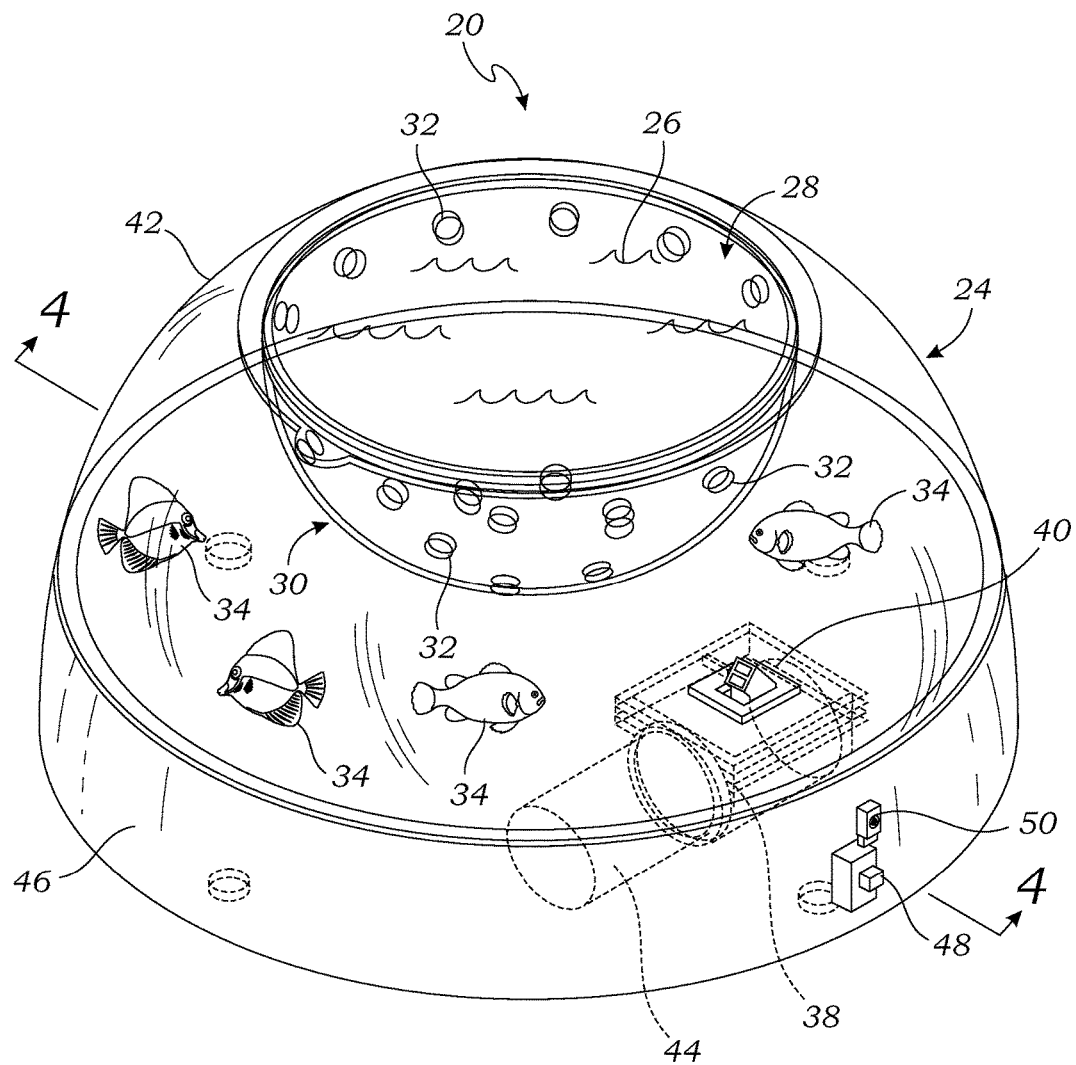
FIG. 3 is a perspective view of a further exemplary interactive water container apparatus, in accordance with at least one embodiment.

With continued reference to FIG. 1, in at least one embodiment, the apparatus 20 provides an at least one interactive object 34 positioned within the outer container 24 such that the at least one inner container 30 is positioned between the interactive object 34 and the opening 28 of the outer container 24—thereby allowing the animal 22 to see the interactive object 34, yet preventing the animal 22 from physically contacting the interactive object 34 (which could otherwise potentially lead to the animal 22 removing the interactive object 34 and possibly ingesting and/or choking on it). In at least one such embodiment, as illustrated in FIG. 1, wherein the at least one inner container 30 is positioned within the outer container 24 such that the opening 28 of the outer container 24 is substantially unobstructed (thereby allowing the animal 22 to access the fluid 26 via the opening 28 of the outer container 24), the at least one interactive object 34 is positioned within the at least one inner container 30. Similarly, in at least such further embodiment, as illustrated in FIG. 3, wherein the at least one inner container 30 is positioned within the opening 28 of the outer container 24, the at least one interactive object 34 is positioned outside of said inner container 30. In at least one embodiment, the at least one interactive object 34 is relatively larger than the at least one container aperture 32 of the at least one inner container 30, thereby preventing the interactive object 34 from passing therethrough. Additionally, in at least one embodiment, the at least one container aperture 32 is relatively smaller than a paw 36 of the animal 22, thereby better ensuring that the animal 22 will not be able to reach therethrough and possibly become stuck. In at least one embodiment, the at least one interactive object 34 is buoyant or otherwise has a neutral buoyancy, the purpose for which is discussed further below; however, in at least one alternate embodiment, the at least one interactive object 34 is not buoyant. It should be noted that the particular size, shape, dimensions and quantity of interactive objects 34 depicted in the drawings is merely exemplary and shown for illustrative purposes. Accordingly, in further embodiments, the at least one interactive object 34 may take on any other size, shape, dimensions or quantities now known or later developed, so long as the apparatus 20 is capable of substantially carrying out the functionality described herein. Furthermore, while the at least one interactive object 34 is depicted as resembling a fish, in further embodiments, the at least one interactive object 34 may resemble any other object now known or later developed—dependent at least in part on the particular type of animal 22 the apparatus 20 is intended to entice.

Figure 2:
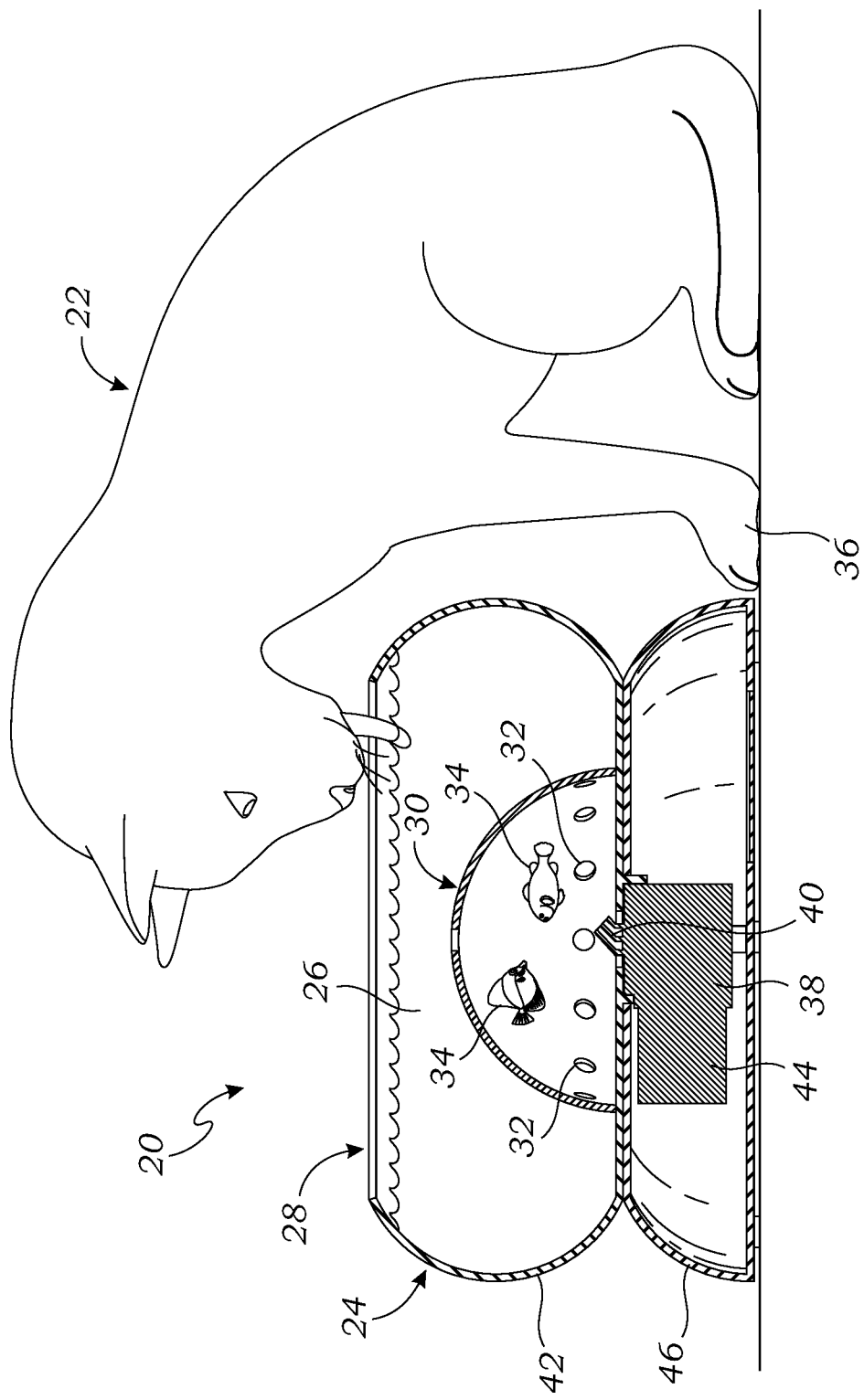
FIG. 2 is a cross-sectional view taken along line 2-2 of FIG. 1.
Figure 4:
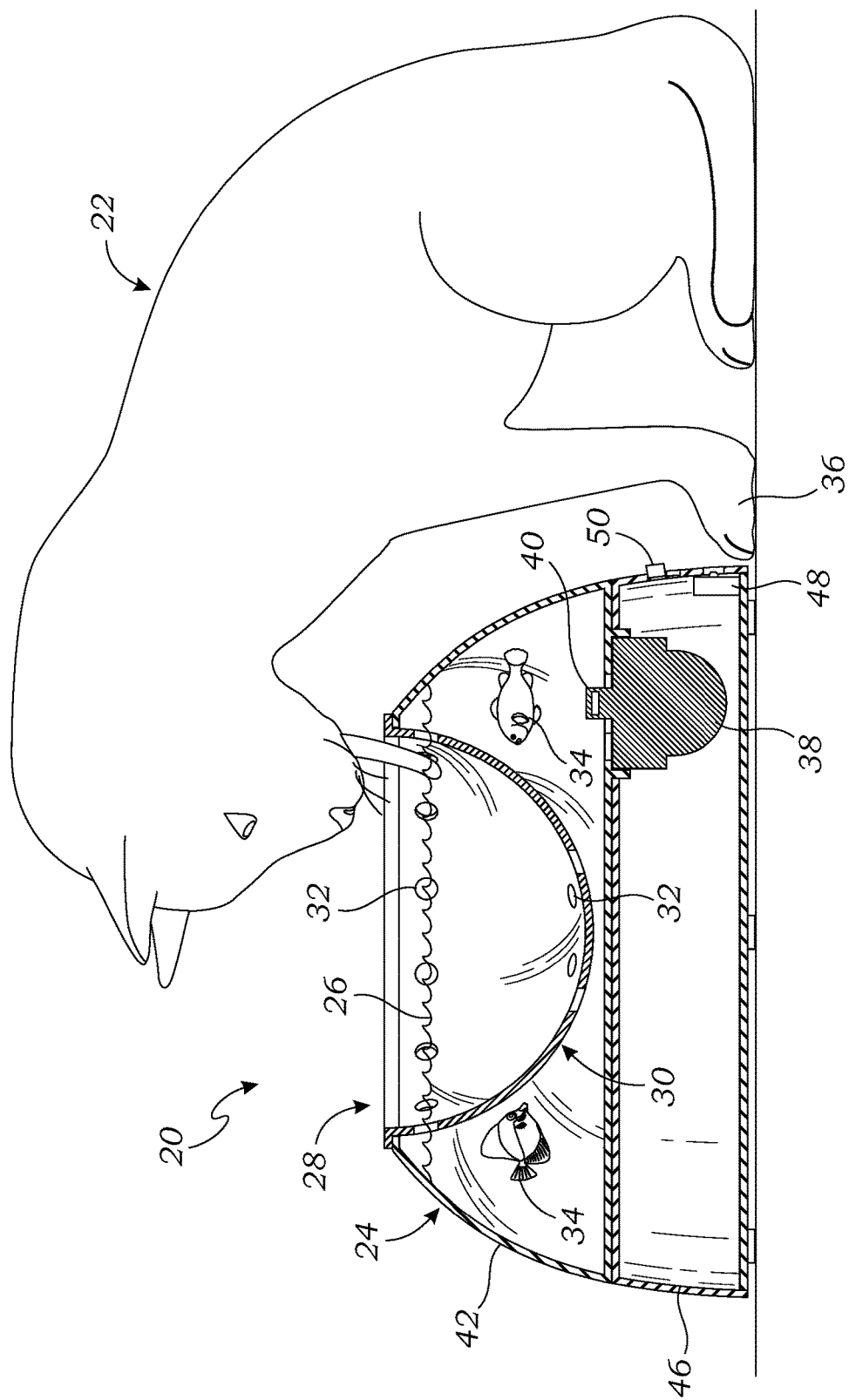
FIG. 4 is a cross-sectional view taken along line 4-4 of FIG. 3.

In at least one embodiment, the apparatus 20 further provides an at least one pump 38 in fluid communication with the outer container 24 and/or the at least one inner container 30. The at least one pump 38 is configured for circulating the fluid 26 within the outer container 24 and the at least one inner container 30. In at least one embodiment, the flow created by the pump 38 also causes the at least one interactive object 34 to move through the fluid 26 (potentially along an unpredictable path in at least on embodiment), which entices the animal 22 into interacting with the fluid 26, and ultimately into drinking the fluid 26. In at least one embodiment, as best illustrated in the cross-sectional views of FIGS. 2 and 4, the pump 38 provides an at least one pump outlet 40 positioned within the outer container 24 for providing a desired flow or current within the fluid 26. For example, in the embodiment illustrated in FIGS. 3-5, where the outer container 24 is substantially semispherical and the at least one interactive object 34 is positioned outside of the at least one inner container 30, the at least one pump outlet 40 is positioned proximal a container wall 42 of the outer container 24, thereby creating a substantially circular flow of fluid 26—which, in turn, causes the at least one interactive object 34 to move through the fluid 26 along a substantially circular, though still potentially unpredictable, path. As a further example, in the embodiment illustrated in FIGS. 1 and 2, wherein the at least one interactive object 34 is positioned within the at least one inner container 30, the at least one pump outlet 40 is further positioned within the at least one inner container 30. It should be noted that the particular size, shape, dimensions and quantity of pump outlets 40—along with the relative positions of said pump outlets 40 within the outer container 24—depicted in the drawings is merely exemplary and shown for illustrative purposes. Accordingly, in further embodiments, the at least one pump outlet 40 may take on any other size, shape, dimensions or quantities now known or later developed, and may be positioned anywhere else within the outer container 24, so long as the apparatus 20 is capable of substantially carrying out the functionality described herein. In at least one embodiment, the at least one pump outlet 40 is rigidly mounted within the outer container 24; however, in at least one further embodiment, the at least one pump outlet 24 is configured for being selectively rotated—either manually or automatically via an appropriate mechanism—so as to allow for the selective adjustment of a flow direction of the fluid 26. In still further embodiments, the at least one pump 38 is configured for allowing a flow rate of the fluid 26 to be selectively adjusted.

In at least one embodiment, the at least one pump 38 provides a filter 44 positioned and configured for filtering the fluid 26 as it is circulated by the pump 38. Thus, in at least one such embodiment, the at least one pump 38 not only causes the fluid 26—and, in turn, the least one interactive object 34—to move, by virtue of the fluid 26 being circulated, but it also helps keep the fluid 26 clean and safe for the animal 22 to drink by virtue of the filter 44.

In at least one embodiment, the at least one pump 38 is positioned within a housing 46 in contact with the outer container 24. However, in at least one alternate embodiment (for example, where the apparatus 20 provides no housing 46), the at least one pump 38 may be positioned elsewhere or otherwise remote from the outer container 24, with the at least one pump outlet 40 still being positioned within the outer container 24. In at least one embodiment, the housing 46 is positioned substantially underneath the outer container 24; however, in further embodiments, the housing 46 may be positioned elsewhere relative to the outer container 24, such as in contact with the container wall 42 of the outer container 24, for example. In that regard, it should be noted that the particular size, shape and dimensions of the housing 46—along with the position of the housing 46 relative to the outer container 24—depicted in the drawings is merely exemplary and shown for illustrative purposes. Accordingly, in further embodiments, the housing 46 may take on any other size, shape or dimensions now known or later developed, and may be positioned anywhere else relative to the outer container 24, so long as the apparatus 20 is capable of substantially carrying out the functionality described herein.

In at least one embodiment, the housing 46 further provides a power supply 48 in electrical communication with the at least one pump 38. In at least one such embodiment, the power supply 48 is an at least one battery—either rechargeable and/or replaceable. In an at least one further embodiment, the power supply 48 is an AC and/or DC power supply configured for being selectively plugged into an appropriate electrical outlet. Additionally, in at least one embodiment, the housing 46 provides a switch 50 in electrical communication with each of the at least one pump 38 and power supply 48, for selectively powering the at least one pump 38 on and off.

As mentioned above, in at least one embodiment, the at least one interactive object 34 is configured for moving through the fluid 26 by virtue of the at least one pump 38. In at least one alternate embodiment, the at least one interactive object 34 is magnetic, and the housing 46 provides an at least one corresponding magnet positioned and configured for causing the at least one interactive object 34 to move through the fluid 26 within the outer container 24. In at least one further alternate embodiment, the at least one interactive object 34 is mechanized and configured for independently moving through the fluid 26 within the outer container 24. It should be noted that, in such alternate embodiments, the at least one pump 38 may still be present and configured for circulating and filtering the fluid 26.

Aspects of the present specification may also be described as follows:

1. An interactive water container apparatus configured for encouraging an animal to drink therefrom, the apparatus comprising: an outer container sized and configured for holding a volume of fluid, the outer container providing an at least one opening sized and configured for allowing the animal to access and drink the fluid therewithin; an at least one inner container positioned substantially within the outer container; an at least one interactive object positioned within the outer container such that the at least one inner container is positioned between the interactive object and the opening of the outer container, thereby allowing the animal to see said interactive object while being unable to physically contact said interactive object; and an at least one pump in fluid communication with at least one of the outer container and the at least one inner container, the at least one pump configured for circulating the fluid within at least one of the outer container and the at least one inner container; whereby, through circulating the fluid, the pump further causes the at least one interactive object to move through the fluid, which entices the animal into interacting with, and ultimately into drinking, the fluid.

2. The interactive water container apparatus according to embodiment 1, wherein the at least one inner container is removably positioned within the outer container.

3. The interactive water container apparatus according to embodiments 1-2, wherein the at least one inner container is permanently positioned within the outer container.

4. The interactive water container apparatus according to embodiments 1-3, wherein the at least one inner container is in fluid communication with the outer container, the at least one inner container providing an at least one container aperture positioned and configured for allowing the fluid to freely flow between said inner container and the outer container.

5. The interactive water container apparatus according to embodiments 1-4, wherein the at least one interactive object is relatively larger than the at least one container aperture of the at least one inner container.

6. The interactive water container apparatus according to embodiments 1-5, wherein the at least one container aperture is relatively smaller than a paw of the animal.

7. The interactive water container apparatus according to embodiments 1-6, wherein the outer container is constructed out of a transparent or semi-transparent material.

8. The interactive water container apparatus according to embodiments 1-7, wherein the outer container is constructed out of an opaque material.

9. The interactive water container apparatus according to embodiments 1-8, wherein the at least one inner container is constructed out of a transparent or semi-transparent material.

10. The interactive water container apparatus according to embodiments 1-9, wherein the at least one pump provides an at least one pump outlet positioned within at least one of the outer container and the at least one inner container for providing a desired current within the fluid.

11. The interactive water container apparatus according to embodiments 1-10, wherein: the at least one inner container is positioned within the outer container such that the opening of the outer container is substantially unobstructed; and the at least one interactive object is positioned within the at least one inner container.

12. The interactive water container apparatus according to embodiments 1-11, wherein the at least one pump outlet is positioned within the at least one inner container.

13. The interactive water container apparatus according to embodiments 1-12, wherein: the at least one inner container is positioned within the opening of the outer container; and the at least one interactive object is positioned outside of said inner container.

14. The interactive water container apparatus according to embodiments 1-13, wherein the at least one pump outlet is positioned outside of the at least one inner container, proximal a container wall of the outer container.

15. The interactive water container apparatus according to embodiments 1-14, wherein the at least one pump outlet is rigidly mounted within at least one of the outer container and the at least one inner container.

16. The interactive water container apparatus according to embodiments 1-15, wherein the at least one pump outlet is configured for being selectively rotated so as to allow for the selective adjustment of a flow direction of the fluid.

17. The interactive water container apparatus according to embodiments 1-16, wherein the at least one pump is configured for allowing a flow rate of the fluid to be selectively adjusted.

18. The interactive water container apparatus according to embodiments 1-17, wherein the at least one interactive object is buoyant or otherwise has a neutral buoyancy.

19. The interactive water container apparatus according to embodiments 1-18, wherein the at least one pump provides a filter positioned and configured for filtering the fluid as it is circulated by the pump.

20. The interactive water container apparatus according to embodiments 1-19, further comprising a housing in contact with the outer container and configured for containing the at least one pump therewithin.

21. The interactive water container apparatus according to embodiments 1-20, wherein the housing is positioned substantially underneath the outer container.

22. The interactive water container apparatus according to embodiments 1-21, wherein the housing provides a power supply in electrical communication with the at least one pump.

23. The interactive water container apparatus according to embodiments 1-22, wherein the housing provides a switch in electrical communication with each of the at least one pump and power supply for selectively powering the at least one pump on and off.

24. An interactive water container apparatus configured for encouraging an animal to drink therefrom, the apparatus comprising: an outer container sized and configured for holding a volume of fluid, the outer container providing an at least one opening sized and configured for allowing the animal to access and drink the fluid therewithin; an at least one inner container positioned substantially within, and in fluid communication with, the outer container, the at least one inner container providing an at least one container aperture positioned and configured for allowing the fluid to freely flow between said inner container and the outer container; an at least one interactive object positioned within the outer container such that the at least one inner container is positioned between the interactive object and the opening of the outer container, thereby allowing the animal to see said interactive object while being unable to physically contact said interactive object; and an at least one pump in fluid communication with the outer container and the at least one inner container, the at least one pump configured for circulating the fluid within the outer container and the at least one inner container; whereby, through circulating the fluid, the pump further causes the at least one interactive object to move through the fluid, which entices the animal into interacting with, and ultimately into drinking, the fluid.

25. An interactive water container apparatus configured for encouraging an animal to drink therefrom, the apparatus comprising: an outer container sized and configured for holding a volume of fluid, the outer container providing an at least one opening sized and configured for allowing the animal to access and drink the fluid therewithin; an at least one inner container positioned substantially within, and in fluid communication with, the outer container, the at least one inner container providing an at least one container aperture positioned and configured for allowing the fluid to freely flow between said inner container and the outer container; an at least one interactive object positioned within the outer container such that the at least one inner container is positioned between the interactive object and the opening of the outer container, thereby allowing the animal to see said interactive object while being unable to physically contact said interactive object; a housing in contact with the outer container; an at least one pump positioned within the housing in fluid communication with the outer container and the at least one inner container, the at least one pump configured for circulating the fluid within the outer container and the at least one inner container; whereby, through circulating the fluid, the pump further causes the at least one interactive object to move through the fluid, which entices the animal into interacting with, and ultimately into drinking, the fluid.

In closing, regarding the exemplary embodiments of the present invention as shown and described herein, it will be appreciated that an interactive water container apparatus for animals is disclosed and configured for encouraging said animals to drink therefrom. Because the principles of the invention may be practiced in a number of configurations beyond those shown and described, it is to be understood that the invention is not in any way limited by the exemplary embodiments, but is generally directed to an interactive water container apparatus for animals and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. An interactive water container apparatus configured for encouraging an animal to drink therefrom, the apparatus comprising:

an outer container sized and configured for holding a volume of fluid, the outer container providing at least one opening sized and configured for allowing the animal to access and drink the fluid therewithin;

at least one inner container positioned substantially within the outer container;

at least one interactive object positioned within the outer container such that the at least one inner container is positioned between the interactive object and the opening of the outer container, thereby allowing the animal to see said interactive object while being unable to physically contact said interactive object; and at least one pump in fluid communication with at least one of the outer container and the at least one inner container, the at least one pump configured for circulating the fluid within at least one of the outer container and the at least one inner container;

wherein, through circulating the fluid, the pump further causes the at least one interactive object to move through the fluid, which entices the animal into interacting with, and ultimately into drinking, the fluid.

2. The interactive water container apparatus of claim 1, wherein the at least one inner container is removably positioned within the outer container.

3. The interactive water container apparatus of claim 1, wherein the at least one inner container is in fluid communication with the outer container, the at least one inner container providing at least one container aperture positioned and configured for allowing the fluid to freely flow between said inner container and the outer container.

4. The interactive water container apparatus of claim 3, wherein the at least one interactive object is relatively larger than the at least one container aperture of the at least one inner container.

5. The interactive water container apparatus of claim 3, wherein the at least one container aperture is relatively smaller than a paw of the animal.

6. The interactive water container apparatus of claim 1, wherein the outer container is constructed out of a transparent or semi-transparent material.

7. The interactive water container apparatus of claim 1, wherein the at least one inner container is constructed out of a transparent or semi-transparent material.

8. The interactive water container apparatus of claim 1, wherein the at least one pump provides at least one pump outlet positioned within at least one of the outer container and the at least one inner container for providing a desired current within the fluid.

9. The interactive water container apparatus of claim 8, wherein:
the at least one inner container is positioned within the outer container such that the opening of the outer container is substantially unobstructed; and
the at least one interactive object is positioned within the at least one inner container.

10. The interactive water container apparatus of claim 9, wherein the at least one pump outlet is positioned within the at least one inner container.

11. The interactive water container apparatus of claim 8, wherein:
the at least one inner container is positioned within the opening of the outer container; and
the at least one interactive object is positioned outside of said inner container.

12. The interactive water container apparatus of claim 11, wherein the at least one pump outlet is positioned outside of the at least one inner container, proximal a container wall of the outer container.

13. The interactive water container apparatus of claim 8, wherein the at least one pump outlet is configured for being selectively rotated so as to allow for the selective adjustment of a flow direction of the fluid.

14. The interactive water container apparatus of claim 1, wherein the at least one interactive object is buoyant or otherwise has a neutral buoyancy.

15. The interactive water container apparatus of claim 1, wherein the at least one pump provides a filter positioned and configured for filtering the fluid as it is circulated by the pump.

16. The interactive water container apparatus of claim 1, further comprising a housing in contact with the outer container and configured for containing the at least one pump therewithin.

17. The interactive water container apparatus of claim 16, wherein the housing is positioned substantially underneath the outer container.

18. The interactive water container apparatus of claim 16, wherein the housing provides a power supply in electrical communication with the at least one pump.

19. An interactive water container apparatus configured for encouraging an animal to drink therefrom, the apparatus comprising:
an outer container sized and configured for holding a volume of fluid, the outer container providing at least one opening sized and configured for allowing the animal to access and drink the fluid therewithin;
at least one inner container positioned substantially within, and in fluid communication with, the outer container, the at least one inner container providing at least one container aperture positioned and configured for allowing the fluid to freely flow between said inner container and the outer container;
at least one interactive object positioned within the outer container such that the at least one inner container is positioned between the interactive object and the opening of the outer container, thereby allowing the animal to see said interactive object while being unable to physically contact said interactive object; and
at least one pump in fluid communication with the outer container and the at least one inner container, the at least one pump configured for circulating the fluid within the outer container and the at least one inner container;
wherein, through circulating the fluid, the pump further causes the at least one interactive object to move through the fluid, which entices the animal into interacting with, and ultimately into drinking, the fluid.

20. An interactive water container apparatus configured for encouraging an animal to drink therefrom, the apparatus comprising:
an outer container sized and configured for holding a volume of fluid, the outer container providing at least one opening sized and configured for allowing the animal to access and drink the fluid therewithin;
at least one inner container positioned substantially within, and in fluid communication with, the outer container, the at least one inner container providing at least one container aperture positioned and configured for allowing the fluid to freely flow between said inner container and the outer container;
at least one interactive object positioned within the outer container such that the at least one inner container is positioned between the interactive object and the opening of the outer container, thereby allowing the animal to see said interactive object while being unable to physically contact said interactive object;
a housing in contact with the outer container;
at least one pump positioned within the housing in fluid communication with the outer container and the at least one inner container, the at least one pump configured for circulating the fluid within the outer container and the at least one inner container;
wherein, through circulating the fluid, the pump further causes the at least one interactive object to move through the fluid, which entices the animal into interacting with, and ultimately into drinking, the fluid.

* * * * *